United States Patent [19]
Hippel et al.

[11] 3,924,651
[45] Dec. 9, 1975

[54] METERING OR INJECTION ELEMENT

[75] Inventors: Ludwig Jakob Hippel, Lindau; Alex Pemsl, Hergensweiler, both of Germany

[73] Assignee: The Upjohn Company, Kalamazoo, Mich.

[22] Filed: Oct. 15, 1974

[21] Appl. No.: 514,593

Related U.S. Application Data

[63] Continuation of Ser. No. 365,605, May 31, 1973, abandoned.

[52] U.S. Cl. ............... 137/115; 137/563; 137/606; 137/625.5
[51] Int. Cl.² .......................................... B29B 1/04
[58] Field of Search ... 137/563, 606, 625.5, 625.66, 137/115

[56] References Cited
UNITED STATES PATENTS

| | | | |
|---|---|---|---|
| 981,313 | 1/1911 | Robinson | 251/63.5 X |
| 1,923,788 | 8/1933 | Mastenbrook | 251/61.4 |
| 3,115,891 | 12/1963 | Kimm | 137/503 X |
| 3,301,274 | 1/1967 | Kenney | 137/625.66 |
| 3,373,762 | 3/1968 | Korchak | 137/606 X |
| 3,533,446 | 10/1970 | Kirk | 137/625.66 |
| 3,583,439 | 6/1971 | Dolenz et al. | 137/624.18 |
| 3,788,337 | 1/1974 | Breer | 137/563 X |

FOREIGN PATENTS OR APPLICATIONS

| | | | |
|---|---|---|---|
| 1,235,484 | 5/1960 | France | 137/625.66 |

*Primary Examiner*—Alan Cohan
*Assistant Examiner*—Gerald A. Michalsky
*Attorney, Agent, or Firm*—St. Onge Mayers Steward & Reens

[57] ABSTRACT

The present invention relates to an injection element, especially a three-way metering valve for plastic molding machines, comprising an injection nozzle which opens into a mixing chamber, a return flow port which returns the supplied material flow in circulation in the case of an interruption of the injection process, and a control element for the switchover of the material flow from the injection step to the return step and vice versa, wherein a return valve is positioned in the end of said return flow port; said injection valve and said return valve having identical or analogous characteristics of their flow and opening cross-sections at any degree of opening thereof; and said injection valve and said return valve being adapted to be operated by said control element in opposite directions for the initiation of the injection process.

8 Claims, 5 Drawing Figures

METERING OR INJECTION ELEMENT

This is a continuation of application Ser. No. 365,605 filed May 31, 1973, now abandoned.

The present invention relates to a metering or injection element especially a three-way metering valve for metering, injecting and mixing systems, comprising an injection nozzle opening into a mixing chamber, a return port for returning the feed material flow in circulating fashion in the case of an interruption of the injection process, as well as a control element for the switchover of the material flow from injection to circulation and vice versa.

In the metering or injection of individual liquid components of plastic materials, e.g. of the raw materials and additives of polyurethane, into a mixing chamber wherein an intimate mixing of the components is effected, it is prior condition that the components are introduced into the mixing chamber absolutely simultaneously, i.e. without any lead or lag. Otherwise, the product obtained may become imperfect.

However, in view of the fact that more and more different requirements are imposed on the products to be prepared with respect to their physical properties, their sizes, their shapes and the like, the metering devices with respect to operation and control must permit as readily as possible an adjustment of the metering or individual components or an adjustment of the metering ratios of the components relative to each other. For example, in the case of polyurethane mixing heads, up to seven or eight components may be involved both in different quantities and with different viscosities.

In order to ensure the absolute synchronism of the start and the end of the injection of a plurality of metering valve associated with a mixing chamber, the individual components must be fed to the nozzle orifices in biased pressure conditions which preferably are coordinated among the individual components, too. At the same time, it has to be prevented that this pressure condition is substantially affected by the actuation of the metering valve. This serves to avoid the consequences of a "breathing" of the feed pipes and of any possible air inclusions at the start and end of an injection interval, so that at the start of the injection the injection pressure is not required to build up only at the injection cycle initiated with a delay, and no lag is caused at the end of the injection interval by relief.

In a known injection system, the individual components, particularly in the case of more than two components, each circulate back to the reservoir within a closed circulation system by means of a feed pump (e.g. a gear pump) through the metering valve, with the introduction of a throttle valve or return valve connected to the downstream side of the metering valve. Simultaneously with the opening of the metering valve, the circulation through the return valve is automatically stopped, so that at the start of the injection cycle the return pressure built up by the return valve is available for the metering process. For the setting of constant pressure conditions, the pressure produced by the metering nozzle during the injection process must be simulated at the return valve.

In this conventional injection system, the nozzles must be replaced in the case of a substantial variation of the quantity to be metered, this resulting in a time-consuming downtime of the plant, since the return pressure must be adjusted in accordance with the pressure conditions of the new metering nozzle. Commonly known adjustable nozzles, in turn, normally offer paths of excessive length within the nozzle or from the nozzle to the mixing chamber, so that, owing to the different viscosities and pressure conditions, an undesired lead or lag of the individual components may result.

On the other hand, a variation of the metering is possible in the known injection system by a variation of the pump capacity. However, in the case of greater variations of the injection pressure from the return pressure, there result inadmissible inaccuracies in the metering process or a lead or lag of the components, which can be remedied only by — also relatively lengthy — manual recoordination between the injection pressure and the return pressure.

It is an object of the invention to provide an injection element which avoids the disadvantage of the known constructions, which prevents pressure peaks from occuring during overrun of the injection nozzles by the control or discharge piston, which ensures a substantially simplified variation of the metering over substantially broader ranges of metering, particularly by maintaining and also improving the requisite conditions of accuracy, and which, at the same time, is of optimum simple construction and may be operated safely, quickly and easily, and which, furthermore, permits the full automatization of the control operations with low expenditure.

Another object is to provide an injection element wherein a return flow valve is provided in the end of the return port, wherein the injection valve and the return valve at every degree of opening thereof have identical or analogous characteristics of the flow and opening cross-sections, and wherein the injection valve and the return valve are actuated by the control element in opposite directions for the initiation of the injection process.

This construction according to the invention positively and automatically provides an absolutely identical adaption of the return pressure to the injection pressure in the case of any variation of the quantity supplied or of the injection pressure, whereby a separately manually controlled return valve can be omitted, too.

Hereby, the injection valve and the return valve should be operated simultaneously, except for special situations of adaption.

A further object is to provide an injection element wherein said injection valve and said return valve are arranged on two opposite sides of a control piston of said control element and each have a valve plunger having a free end formed as a valve cone, which plungers are fitted into associated ports including valve seats, whereby said valve plungers are connected to the opposite sides of said control piston, and said control piston is acted upon by the control pressure medium from the one or from the other side thereof, depending on the control postion.

If due to a great variation of the quantity supplied and, thus, a variation of the pressure conditions, a variation of the free nozzle cross-sections is necessary, it is a further object to provide an injection element wherein said valve seat of said return valve is movable in the axial direction of its associated valve plunger and adapted to be moved by an adjustment means towards and away from its valve plunger, whereby the stroke of said control element corresponds to the maximum range of adjustment of said adjustment means.

In this way, the free opening or orifice cross-sections of the injection valve and of the return valve may be adjusted substantially continuously and from a zero setting up to the full cross-sectional area in positively synchronous manner. Thus, the adjustment means may be operated either manually or, particularly, also automatically by set values which depend on specific conditions of operation. For example, the adjustment means may be automatically operated in response of the return pressure, the speed of rotation of the pump or the pumped volume per unit of time, the volumetric feed characteristic of the pump or of the cylinder system, the power consumption of the pumping system, the flow rate of the return valve or the like factors. A further object is to provide an injection element wherein a pressure sampling port is provided in said return flow port, adjacent said return valve, upstream of said valve seat, which pressure sampling port is connected to the one side of an adjustment operating element including a first device responsive to the return pressure, which first device has associated therewith a second device opposing its movement through a control pressure connection, whereby a threaded body is adapted to be adjusted by the two opposing devices through a pinion and a rack being directly actuated with said devices.

A further object is to provide an injection element with an increased range of variation of the metering process wherein between said axially movable valve seat and said adjustment means there is provided a liquid-tight intermediate chamber having a compression spring which reacts on the one hand against said valve seat and on the other hand against said adjustment means, whereby said intermediate chamber is additionally filled with a pressure medium which communicates with the one side of a piston-cylinder assembly the other side of which communicates with the side of said control cylinder adjacent said injection nozzle, and wherein the piston of said assembly is connected to a valve which blocks said intermediate chamber against an exit of pressure fluid when the control pressure is applied to the other side of said piston.

If the valve seat of the injection valve is shaped so as to taper conically towards the mixing chamber, and the smallest nozzle cross-section is arranged adjacent or directly at the inner side of the mixing chamber, no dead spaces are left within the nozzle for residual amounts of the component, such that lead or lag by this residual component is avoided.

The advantages according to the invention can be obtained especially by association of a plurality of identical three-way metering valves according to the invention on a mixing head including connections to corresponding recirculation conduits for different components and including a central synchronous control of all of the metering valves. The metering valves according to the invention may be switched substantially during uniterrupted operation, and that over substantially increased ranges. In the preferred embodiment, every variation of the total quantity, of the ratios between the components, and also the combination of the components involved, may be automatically adjusted in accordance with specifically prepared programs, and that irrespective of the influences of their different viscosities (e.g. variations of the leakage gap losses within the pump).

The injection element or metering valve according to the invention may be used both in low-pressure systems and in medium-pressure and high-pressure systems.

These and other objects will be apparent from the drawing and the following description. Referring to the drawing.

Figure 1:
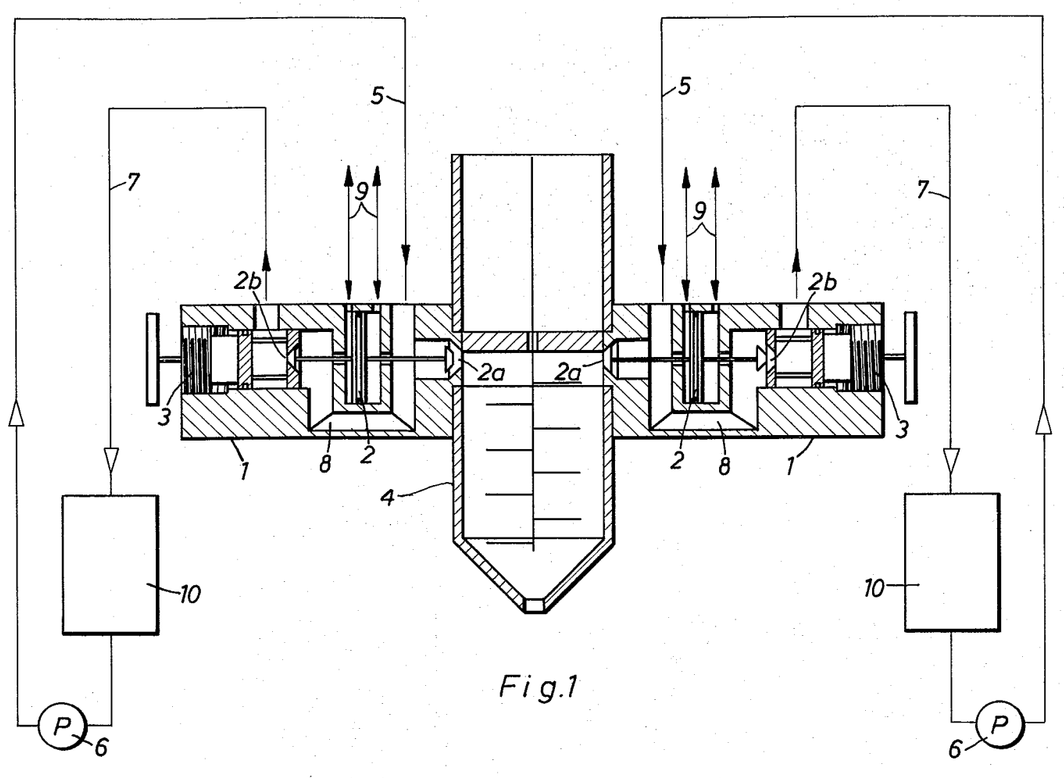
FIG. 1 is a schematical view in longitudinal section of a mixing mechanism provided with the metering or injection valve according to the invention.
Figure 2:
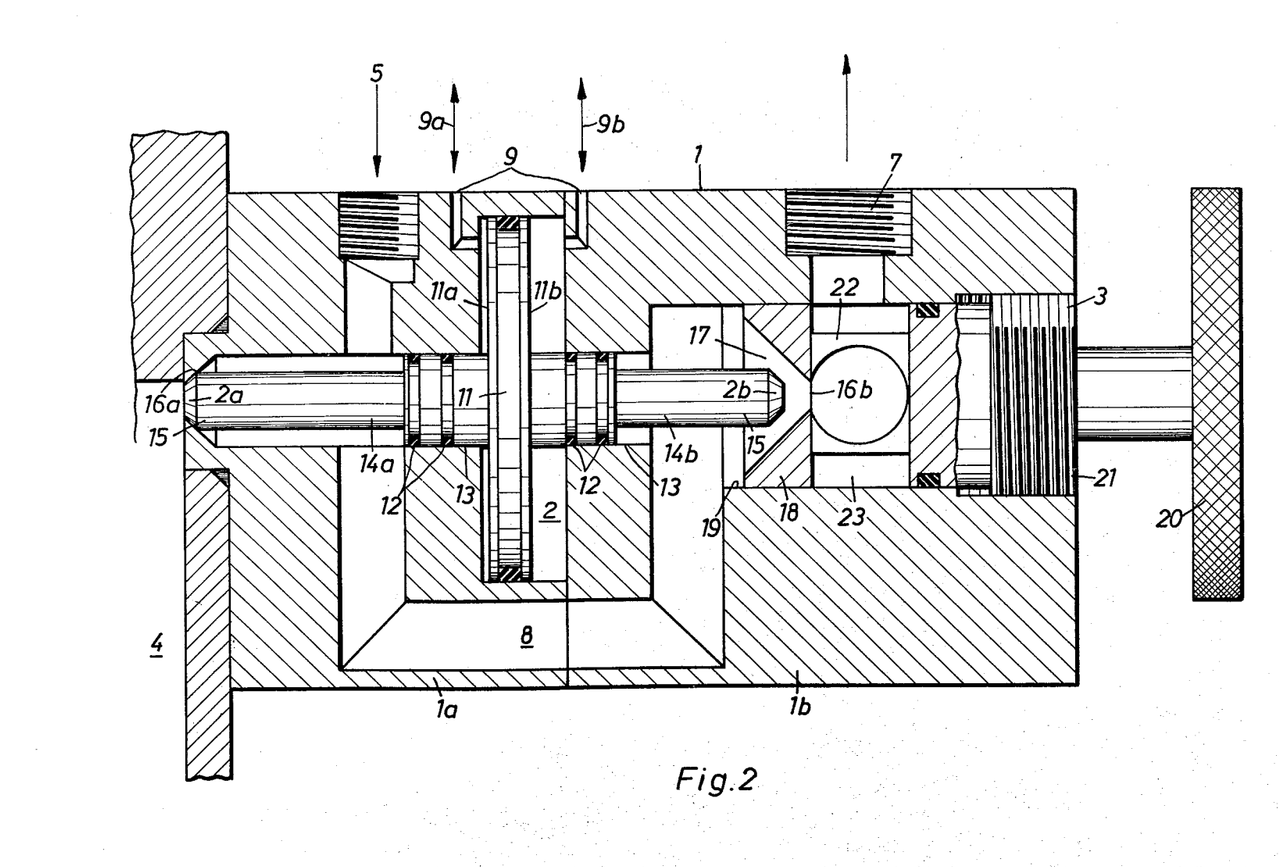
FIG. 2 is an enlarged view in longitudinal section of an individual metering or injection element according to the invention.

As shown in FIGS. 1 and 2 of the drawings, a mixing chamber 4 has opening thereinto a plurality of metering valves 1 for supplying the individual plastic components the number of which, e.g. in the case of polyurethane mixing heads, may amount to from 7 to 8 and which, depending on the properties of the individual materials, are to be mixed with each other in most varied quantities and viscosities.

Each of said metering valves 1 is connected to a material circuit wherein the liquid material is pumped with as constant as possible a pressure through a supply conduit 5 into the metering valve 1 from a reservoir 10 containing the supply of the respective mixing component, by means of a feed pump 6, e.g. a gear pump driven by an electric motor. For the metering operation, a control cylinder 2 which is alternately acted upon from opposite sides through connections 9 by a control pressure medium, opens an injection valve 2a which opens into the mixing chamber 4 and through which a predetermined quantity of the plastic material component to be admixed is introduced into the mixing chamber 4 during the opening period of this valve.

When the injection valve 2a is closed, the material flow which is continuously supplied by the feed pump 6, circulates through a return flow passage 8 and a return valve 2b via a return conduit 7 of maximum cross-sectional area in a closed circuit to the reservoir 10.

As shown in detail in FIG. 2, the control cylinder 2 which may be housed within the housing of the metering valve consisting, for example, of two sections 1a and 1b, has guided therein a control piston 11 having two opositely positioned faces 11a and 11b. Depending on whether the control piston 11 is subjected to the control pressure medium (e.g. compressed air) through a port 9a or a port 9b, the control piston 11 reciprocates within the control cylinder 2. The plungers 14a or 14b of the injection valve 2a and of the return valve 2b, respectively, are attached to respectively opposite faces of the control piston 11 in such a manner that during the movement of the control piston 11 into the closed position of the injection valve 2a, the return valve 2b is correspondingly opened, and vice versa. The control piston 11 may be slidingly sealed by means of gaskets 12 within guide bushings 13.

At their respective free ends 15, the plungers 14a and 14b are conically bevelled complementary to the shape of the respectively associated valve seats 16a and 16b in the injection valve 2a and in the return valve 2b, respectively, such that they define an annular valve port 17 having preferably parallel lateral sides when the respective valve is open.

In this way, both valves, namely the injection valve 2a and the return valve 2b, have essentially absolutely identical opening and closing characteristics such that the pressure drops of the two valves in their open positions are substantially of equal magnitude and are constant also during the transition from the opening of the one valve to the closing of the other valve. In this manner, it is ensured that the pressure to which the material charge pressurized by the feed pump 6 is subjected, between the feed pump 6 and up to the return conduit 7 is maintained constant irrespective of the position of the valves.

When the injection valve 2a is closed, the flow of material flows through the return passage 8 of relatively great cross-sectional area to the return valve 2b and through the latter into the return conduit 7.

The valve seat 16b is arranged in a slide member 18 which is slidingly movable in a bushing 19 coaxially to the plungers 14. On its side opposite from the plunger 14b, the slide member 18 is supported by an adjustment means 3 having a threaded body 21 adapted to be screwed in and out in axial direction of the plungers 14 e.g. by means of a handwheel 20. Positioned on this handwheel 20 or connected thereto, preferably there is provided a position indicator or a measuring device, so that a nozzle cross-section, once established, can be exactly reproduced or set again at any desired point of time. At its end abutting the slide member 18, the threaded body 21 is provided with, for instance, two transverse passages 22 crossing or intersecting each other in the longitudinal axis of this body, which passages have a relatively great free cross-sectional area, and into which passages the return valve 2b opens at the outlet side thereof. The transverse passages 22 are interconnected by an annular passage 23 from which the flow of material enters the return conduit 7.

If, at constant feed pressure of the feed pump 6, a greater (or lesser) quantity of a mixture component is to be introduced into the mixing chamber per unit of time, it is only necessary to adjust the threaded body 21 to the effect that the free distance of stroke of the control piston 11 is increased (decreased). An increase of this stroke also increases the free flow cross-section of the annular port 17 of the valve and, thus, correspondingly increases the injection port area when the injection valve 2a opens, or the free return area of the return valve 2b, respectively. In view of the fact that the injection valve 2a and the return valve 2b, in this way, not only show an analogous pressure drop characteristic, but also are adjusted together in exactly the same manner, the injection bias remains substantially constant with variation of the quantity injected, so that no impairment of the existing metering conditions can result.

On the other hand, however, the injection pressure may be varied either separately or in addition to the variation of the injection area without an additional readjustment of the return valve 2b being required, because this valve acts absolutely analogously to the characteristic of the injection valve 2a. Thus, in addition to the corresponding control time interval of the control pressure medium, the exact metered quantity can be varied within broad limits in most simple manner both by means of the pump capacity and of the pump pressure as well as by means of the free injection port area. Additionally varied metering ranges may be obtained by different sizes of the dimensions of the plungers 14a or 14b and of the valve seats 16a and 16b as well as of the cone angles of the plungers and of the valve seats.

If the pressure drops in the return flow port 8 and the effects of the transverse passages 22 still show an influence particularly in the case of components of high viscosity, these effects can be compensated for by an additional slight modification in the construction of the return valve 2b.

Figure 3:
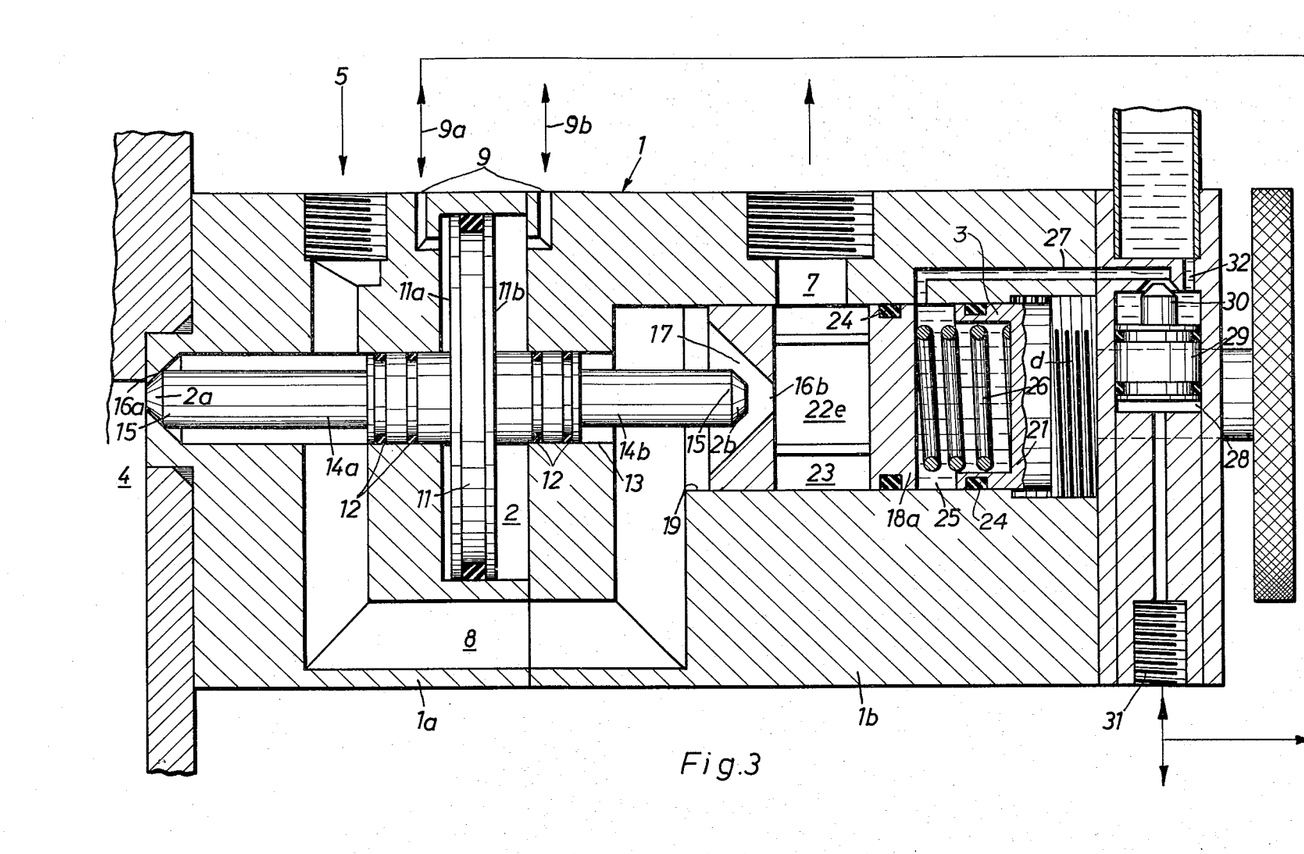
FIG. 3 is an enlarged view in longitudinal section of a preferred embodiment of a metering or injection element.

In the embodiment of the metering valve 1 as shown in FIG. 3, this valve is illustrated in the switchover phase between the injection position and a position wherein the injection is stopped (= position according to FIG. 2). As shown in FIG. 3, the transverse passages 22e may be of rectangular shape, too.

A further substantial improvement of the adaption to different metered quantities is obtained if the transverse passages 22e and the annular passage 23 as well as the connection to the return conduit 7 are formed independently of the threaded body 21 and in combination with the valve seat 16b as a sliding piston 18a which is freely slidable within an uninterrupted bushing or sleeve 19. Between the sliding piston 18a and the threaded body 21, an intermediate chamber 25 sealed by means of gaskets 24 is provided, which intermediate chamber has positioned therein a helical compression spring 26 which reacts with one end thereof against the inner face of the threaded body 21 and with the other end thereof against the side of the sliding piston 18a opposite from the return valve 2b.

The intermediate chamber 25 is filled with a pressurized fluid, preferably a compressed oil, which fluid through a conduit 27 communicates with the one side of a piston 29 guided within a cylinder 28. The level of the compressed oil is monitored via a conduit 32 e.g. by means of a level gauge. The other side of the piston 29 is pressurized by a control air conduit 31 which communicates with the conduits for the control pressure medium for operation of the control cylinder 2.

The piston 29 includes at its side acted upon by the compressed oil valve body of a valve 30 which, when the pressure from the control air conduit 31 acts upon the piston 29, closes the conduit 27 thereby preventing the exit of compressed oil from the intermediate chamber 25, so that the volume of the intermediate chamber 25 and, thus, the position and the spacing of the sliding piston 18a relative to be threaded body 21 is defined.

The position or the spacing of the sliding piston 18a from the threaded body 21 determines the stroke of the control piston 11 which is available for the opening and closing of the injection and return valves.

Prior to putting into operation the metering valve with its positive control of the injection pressure and the recirculation pressure, a predetermined quantity per unit of time is metered or set by means of the adjustment means 3. In the control position according to FIGS. 2 or 3, the quantity of component supplied by the feed pump 6 returns through the return passage 8 (which preferably has a relatively great cross-sectional area in order to avoid a pressure drop and to avoid trouble) via the return valve 2b to the reservoir 10. During the injection phase, the recirculation is interrupted by operation of the control piston 11 through admission of controlled pressure to face 11a thereby closing the return valve 2b, so that the full quantity fed is introduced into the mixing chamber 4 through the injection valve 2a.

Even in the case of great variations of the pump capacity which can be controlled within fractions of a second by D.C. driven pumps (e.g. with a braking motor), neither the return pressure nor the cross-sectional areas of the injection nozzle need be re-adjusted, so that an automatic metering adjustment during operation is possible without having to put up with the previous disadvantages.

In the embodiment of the invention according to FIG. 3, as also in the embodiment according to FIGS. 4 and 5 as described below, a variation of the output quantity is rendered possible by an automatic, pressure-dependent increase of the free cross-sectional areas of the valves.

To this end, the sliding piston 18a is subject on one side thereof to the pressure of the component material, while it is biased on the other side thereof by the helical compression spring (or an element of equivalent function) 26 of FIG. 3, being adjustable by means of the threaded body 21. As soon as the return valve 2b is closed by means of the control pressure medium, the valve 30 closes as well, so that the valve seat 16b is firmly supported in its position by the compressed oil.

Upon adjustment of the desired circulation pressure by means of moving the threaded body 21 against the helical compression spring 26, a circulation pressure, being of increased value because of the increased pump capacity, automatically and in synchronism moves the sliding piston 18a against the force of the compression spring 26, thereby increasing the free valve area of the return valve 2b. Thus, the valve 30 is opened. During switchover to the injection step, the injection valve 2a is moved to a postion affording a flow passage of correspondingly increased cross-sectional area, whereby, however, the sliding piston 18a at the same time is supported against the closing pressure of valve 2b, because the valve 30 is closed. By using different capacities of the control cylinder 2 and of the valve 30 and different lengths of the conduits or passageways, the valve 30 can be adjusted to effect its closure at an earlier point of time than the return valve 2b.

Figure 4:
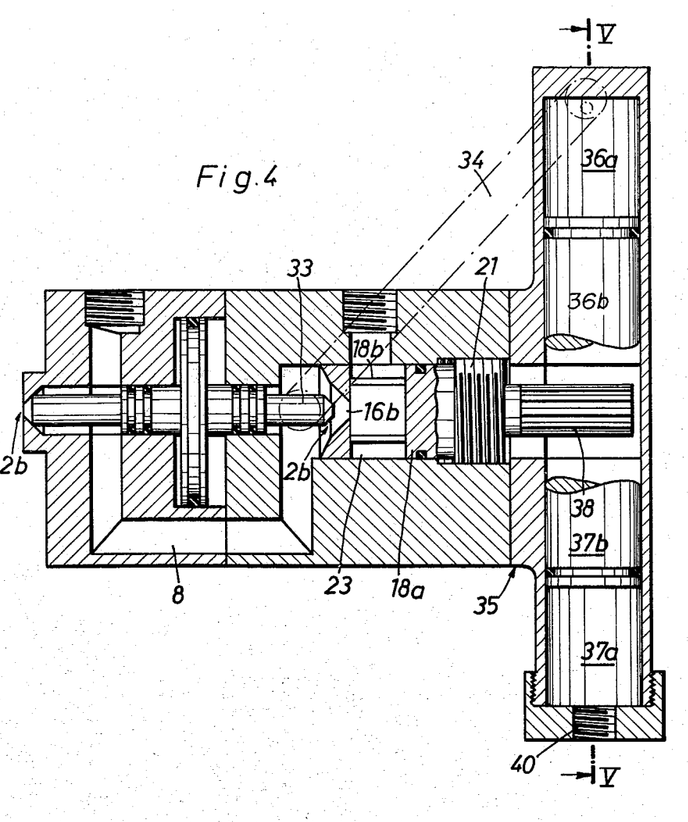
FIG. 4 is a longitudinal section through another preferred embodiment of an automatically adjustable metering or injection element.
Figure 5:
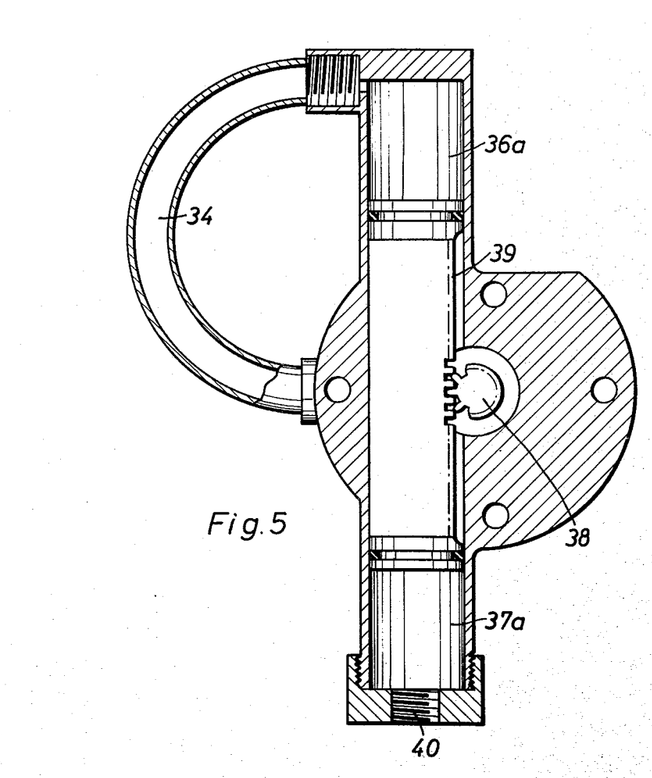
FIG. 5 is a cross-sectional view approximately along the lines V—V of FIG. 4.

In the embodiment shown in FIGS. 4 and 5, the automatic operation of the adjustment means 3 or of the threaded body 21 thereof, respectively, is effected by means of an adjustment actuation element 35 in which a pair of pistons 36b, 37b in corresponding cylinders 36a, 37a are positively interconnected by means of a rack 39 to effect rotation of a pinion 38 secured to the threaded body 21. Thus, the cylinder 36a associated with the piston 36b via a pressure transmission conduit 34 is directly connected, through a pressure sampling port 33, to the component mass present in the region in front of the valve seat 16b. This return pressure-side piston-cylinder assembly (36a, 37a) is counteracted by a control pressure acting through a control pressure port 40 in the cylinder 37a upon the piston 37b, which control pressure is adapted to be set depending on the respectively desired open side of the metering valve or on the metered quantity, respectively. By means of a return pressure increasing, for example, with an increase in the metered or output quantity, a correspondingly increased passage area of the valves is obtained when the return pressure exceeds the adjustable control pressure, e.g. in the form of compressed air, acting upon the piston 37b, as may occur, for instance, in the case of an increase in the pump capacity. Upon adjustment of the thus increased cross-sectional area of the value, the return pressure adjusts itself to the desired value.

By omitting the pressure transmission conduit 34, the illustrated piston-cylinder assemblies may be operated also through separate, e.g. hydraulic, control pressures as may prove necessary primarily in the case of high viscous or crystallizing components.

According to FIG. 4, an increase of the free flow area through the sliding piston 18a is obtained in the sliding piston has bar-shaped webs 18b only in the region of the annular passage 23 thereof.

What we claim is:

1. In plastic molding equipment comprising a mixing chamber having at least one injection port, a reservoir for a liquid plastic component to be injected into the mixing chamber, an improved injection element to supply the component to said chamber injection port, and pump means and associated ducts connecting the injection element to said pump and reservoir to deliver the liquid component to said element and return excess to the reservoir, said improved injection element comprising:

a housing for said element having component feed, injection and return ports, said element injection port being formed to be received in said chamber injection port, and said feed and return ports making connection with said ducts, a pair of shiftable valve members disposed in said housing in back-to-back relation, each having a free end received in one of said injection and return ports, and control means disposed intermediate and positively interconnecting said members for reciprocal movement thereof simultaneously between opposite limiting positions in said housing; annular valve seats formed in said housing at said injection and return ports and cooperating respectively with the free ends of said shiftable valve members to define said limiting positions, said valve seat in said housing injection port being disposed to be substantially coterminus with the injection port of the mixing chamber; said valve seats and valve members defining annular flow passages of such shape and configuration, respectively, as to provide analogous flow passages complementary to each other in all positions of said shiftable valve members between said limiting positions; and adjustment means accessible externally of said injection element housing for varying the position of said return valve seat in said housing relative to said injection valve seat to simultaneously and commonly adjust the flow cross-sectional areas of said injection and return annular flow passages.

2. An injection element as defined in claim 1, wherein said means positively interconnecting said valve members comprises a control piston, a chamber in said housing defining a control cylinder in which said control piston is axially reciprocable, and plunger means connected to opposite faces of said piston, said valve members being located on the free ends of said plungers; and ports in said housing communicating with opposite sides of said piston for fluid pressure communication therewith to axially shift said piston and associated valve member.

3. An injection element as defined in claim 2, wherein said valve members at the free ends of said plungers are of frustoconical configuration and said injection and return seats are of mating configuration, whereby the smallest cross-sectional area of said element injection port is coterminous with the mixing chamber injection port.

4. An injection element as defined in claim 2, wherein said housing is formed to provide a second cylinder within one end of which said return valve seat is slidably received to make a piston fit therein, a plug threadedly received in the other end of said second cylinder, and a compression spring between said seat and plug; a fluid medium filling said second cylinder between said seat and plug, a sight gage and duct means in said housing communicating said second cylinder with said level gage, restricting valve means having movable and stationary members located in said fluid medium duct; a third cylinder in said housing and a piston therein, said last piston on one face carrying said movable member of said restricting valve means to move it into and out of restricting relation to the stationary member thereof, said housing having duct means communicating with the opposite face of said piston, and other duct means connecting to said control cylinder, whereby control pressure applied to said control piston to open said injection valve is also applied to said piston in said third cylinder to close said restricting valve.

5. An injection element as defined in claim 1, wherein the limiting reciprocal movement of said control means is equivalent to maximum range of adjustment of said return valve seat adjustment means 6. An injection element as defined in claim 5, wherein said adjustment means is responsive to pressure at the return valve seat, and duct means communicating said adjustment means with the upstream side of said return valve seat.

7. An injection element as defined in claim 6, wherein said adjustment means comprises a plug on which said return valve seat is supported, a bore in said housing in which said valve seat is slidable and in which said plug is also threadedly received to provide axial adjustment and a gear rack interconnecting them, and a housing for reciprocation of said piston members therein, a pinion connected to said plug and engaging said gear rack to be rotated thereby upon movement of said opposed piston members, said duct means from said return valve communicating with one end of said piston housing to impose component return pressure on the associated piston, and port means at the other end of said piston housing to communicate an external control pressure to the other of said pistons in said adjustment device.

8. An injection element as defined in claim 5, wherein said adjustment means includes a member responsive to pump speed and volume pumped per unit of time.

* * * * *

UNITED STATES PATENT OFFICE
CERTIFICATE OF CORRECTION

Patent No. 3,924,651  Dated December 9, 1975

Inventor(s) Ludwig J. Hippel and Alex Pemsl

It is certified that error appears in the above-identified patent and that said Letters Patent are hereby corrected as shown below:

Column 4, Line 49:   Should read:

two opositely      two oppositely

Column 6, Line 38:   Should read:

oil valve body      oil the valve body

Column 7, Line 64:   Should read:

value, the return     valve, the return

Column 8, Line 4:    Should read:

in the sliding      in that the sliding

Signed and Sealed this twenty-third Day of March 1976

[SEAL]

Attest:

RUTH C. MASON
*Attesting Officer*

C. MARSHALL DANN
*Commissioner of Patents and Trademarks*